(12) United States Patent
Birrell et al.

(10) Patent No.: US 7,731,578 B2
(45) Date of Patent: Jun. 8, 2010

(54) AIR MOVEMENT UNIT FOR BIOMASS CONVEYANCE, SEPARATION, OR COMBINE PERFORMANCE ENHANCEMENT

(75) Inventors: Stuart J. Birrell, Ames, IA (US); Mark D. Dilts, Sioux Falls, SD (US); Benjamin J. Schlesser, Davenport, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 12/262,271

(22) Filed: Oct. 31, 2008

(65) Prior Publication Data

US 2009/0113867 A1      May 7, 2009

Related U.S. Application Data

(60) Provisional application No. 60/984,719, filed on Nov. 1, 2007.

(51) Int. Cl.
*A01F 12/48* (2006.01)
*B07B 1/50* (2006.01)
*B08B 5/00* (2006.01)

(52) U.S. Cl. ..................................... 460/100
(58) Field of Classification Search ................ 460/100, 460/109, 112, 111, 81; 239/689; 241/222
See application file for complete search history.

(56) References Cited

U.S. PATENT DOCUMENTS

| | | | | |
|---|---|---|---|---|
| 2,626,159 | A | * | 1/1953 | Thompson ................ 239/689 |
| 3,669,122 | A | * | 6/1972 | Rowland-Hill ............. 460/73 |
| 4,489,734 | A | * | 12/1984 | Van Overschelde ......... 460/81 |
| 4,592,514 | A | | 6/1986 | John et al. |
| 4,614,197 | A | * | 9/1986 | Weber et al. ............. 460/112 |
| 4,711,253 | A | * | 12/1987 | Anderson ................ 460/100 |

(Continued)

FOREIGN PATENT DOCUMENTS

DE        1 476 715        6/1977

(Continued)

OTHER PUBLICATIONS

Smith, R.D. et al., "Aerodynamic Separation of Cobs from Corn Harvest Residues", 1985 American Society of Agricultural Engineers 0001-2351/85/2803-0893, vol. 28(3), May-Jun. 1985, pp. 893-902.

(Continued)

*Primary Examiner*—Arpád Fábián-Kovács
(74) *Attorney, Agent, or Firm*—McKee, Voorhees & Sease, P.L.C.

(57) ABSTRACT

A harvesting machine includes a self-propelled vehicle adapted for separating grain from non-grain material, a cleaning shoe and a fan for controlling air flow. The fan is positioned downstream of the cleaning shoe and the fan having an air inlet for providing air to the fan and an aspiration outlet for providing air from the fan. The fan assists in reducing static air pressure within the harvesting machine. The fan may be a centrifugal fan. The harvesting machine may further include a chopper operatively connected to the vehicle and adapted for receiving the non-grain material and chopping the non-grain material and a blower adapted for assisting in conveying the non-grain material from the chopper such as for collection in a collection container.

28 Claims, 5 Drawing Sheets

U.S. PATENT DOCUMENTS

| | | | | |
|---|---|---|---|---|
| 4,924,662 | A * | 5/1990 | Quick | 56/12.8 |
| 5,031,392 | A * | 7/1991 | Baker | 56/13.9 |
| 5,120,275 | A * | 6/1992 | Zacharias | 460/111 |
| 5,941,768 | A | 8/1999 | Flamme | |
| 6,272,819 | B1 * | 8/2001 | Wendte et al. | 56/11.9 |
| 6,354,938 | B1 * | 3/2002 | Schrattenecker | 460/112 |
| 6,358,141 | B1 | 3/2002 | Stukenholtz et al. | |
| 6,500,064 | B1 * | 12/2002 | Schrattenecker | 460/112 |
| 6,663,485 | B2 * | 12/2003 | Niermann | 460/79 |
| 6,685,558 | B2 * | 2/2004 | Niermann et al. | 460/111 |
| 6,736,721 | B2 * | 5/2004 | Niermann et al. | 460/112 |
| 6,881,145 | B2 * | 4/2005 | Holmen | 460/112 |
| 7,063,613 | B2 * | 6/2006 | Weichholdt | 460/112 |
| 2002/0142814 | A1 * | 10/2002 | Niermann | 460/79 |
| 2003/0003974 | A1 * | 1/2003 | Niermann et al. | 460/111 |
| 2003/0017861 | A1 * | 1/2003 | Niermann et al. | 460/112 |
| 2004/0092298 | A1 * | 5/2004 | Holmen | 460/111 |
| 2007/0256403 | A1 * | 11/2007 | Teroerde et al. | 56/16.5 |
| 2008/0234019 | A1 * | 9/2008 | Teroerde et al. | 460/100 |
| 2008/0248843 | A1 * | 10/2008 | Birrell et al. | 460/112 |
| 2009/0042625 | A1 * | 2/2009 | Dow et al. | 460/112 |
| 2009/0113867 | A1 * | 5/2009 | Birrell et al. | 56/13.3 |
| 2009/0193777 | A1 * | 8/2009 | Wendling | 56/10.2 R |

FOREIGN PATENT DOCUMENTS

| | | |
|---|---|---|
| DE | 26 20 875 A1 | 11/1977 |
| EP | 1 177 719 A1 | 2/2002 |
| EP | 1 219 164 A1 | 7/2002 |

OTHER PUBLICATIONS

Smith, R.D. et al., "Development and Evaluation of a Cob Salvaging System", 1984 American Society of Agricultural Engineers 0001-2351/84/2702-0590, pp. 590-596.

International Search Report, Iowa State University Research Foundation, Inc., PCT/US2008/081935, 2 pages.

* cited by examiner

AIR MOVEMENT UNIT FOR BIOMASS CONVEYANCE, SEPARATION, OR COMBINE PERFORMANCE ENHANCEMENT

CROSS-REFERENCE TO RELATED APPLICATIONS

This application claims priority under 35 U.S.C. §119 to a provisional application, U.S. Ser. No. 60/984,719 filed Nov. 1, 2007, which is hereby incorporated by reference in its entirety.

BACKGROUND OF THE INVENTION

The present invention relates to air flow separation associated with a harvesting machine, more particularly, but not exclusively, the present invention relates to air flow separation of a harvesting machine which is adapted to harvest grain as well as biomass material also sometimes referred to as crop residue, cellulosic material, stover, or material other than grain (MOG) which may include leaves, stalks, husks, chaff, or any other material that passes through a combine but is not removed in the grain stream.

Harvesting machines or combines are self-propelled machines which harvest, thresh, separate, and clean an agricultural crop. The resulting clean grain is stored in a grain tank located on the harvesting machine and can be transported from the grain tank to a wagon, cart, truck, or other container by an unloading auger. In a typical process, after separation and threshing of the grain, it is directed to a cleaning system that typically includes a cleaning shoe having a chaffer and a sieve. A cleaning fan directs aspirated air through the chaffer and sieve blowing the lighter chaff and straw out the rear of the combine. The clean grain, being heavier falls through the chaffer and sieve and may be collected by a clean grain auger which directs it to a clean grain elevator which conveys the clean grain to the grain tank.

One of the problems with combines is providing sufficient airflow out of the cleaning shoe, particularly in a manner which does not add increased complexity to the design or operation of the combine. Another seemingly unrelated problem to one not having the benefit of this disclosure involves biomass collection and the addition air flow related problems introduced by biomass collections. Thus, what is needed is a combine with an air movement unit that assists in biomass conveyance or enhances combine performance.

Therefore, it is a primary object, feature, or advantage of the present invention to improve over the state of the art.

SUMMARY OF THE INVENTION

According to one aspect of the present invention, a harvesting machine includes a self-propelled vehicle adapted for separating grain from non-grain material, a cleaning shoe and a fan for controlling air flow. The fan is positioned downstream of the cleaning shoe and the fan having an air inlet for providing air to the fan and an aspiration outlet for providing air from the fan. The fan assists in reducing static air pressure within the harvesting machine.

According to another aspect of the present invention, a harvesting machine includes a self-propelled vehicle adapted for separating grain from non-grain material, a chopper operatively connected to the vehicle and adapted for receiving the non-grain material and chopping the non-grain material, a blower adapted for assisting in conveying the non-grain material from the chopper, a fan for controlling air flow; an air inlet for providing air to the fan, and an aspiration outlet for providing air from the fan.

According to another aspect of the present invention, a method for controlling air flow includes providing a harvesting machine comprising (a) a self-propelled vehicle adapted for separating grain from non-grain material, (b) a cleaning shoe, (c) a fan for controlling air flow, the fan positioned downstream of the cleaning shoe and the fan having an air inlet and an aspiration outlet, and (d) wherein the fan assists in reducing static air pressure within the harvesting machine. The method further includes intake of air through the air inlet of the fan and aspirating air through an aspiration outlet of the fan. The fan can have other functions, included but not limited to, separation of lighter non-grain material from heavier non-grain material.

DETAILED DESCRIPTION

The present invention is described in the context of a combine harvester can perform either or both of two separate functions of biomass capturing or biomass spreading. The spreading function is associated with conventional combines which collect grain and spread crop residue back on to ground. Although the present invention is advantageous in the context of a combine harvester which can provide for both biomass capturing and biomass spreading, it may also be used in the context of conventional combines.

Figure 1:
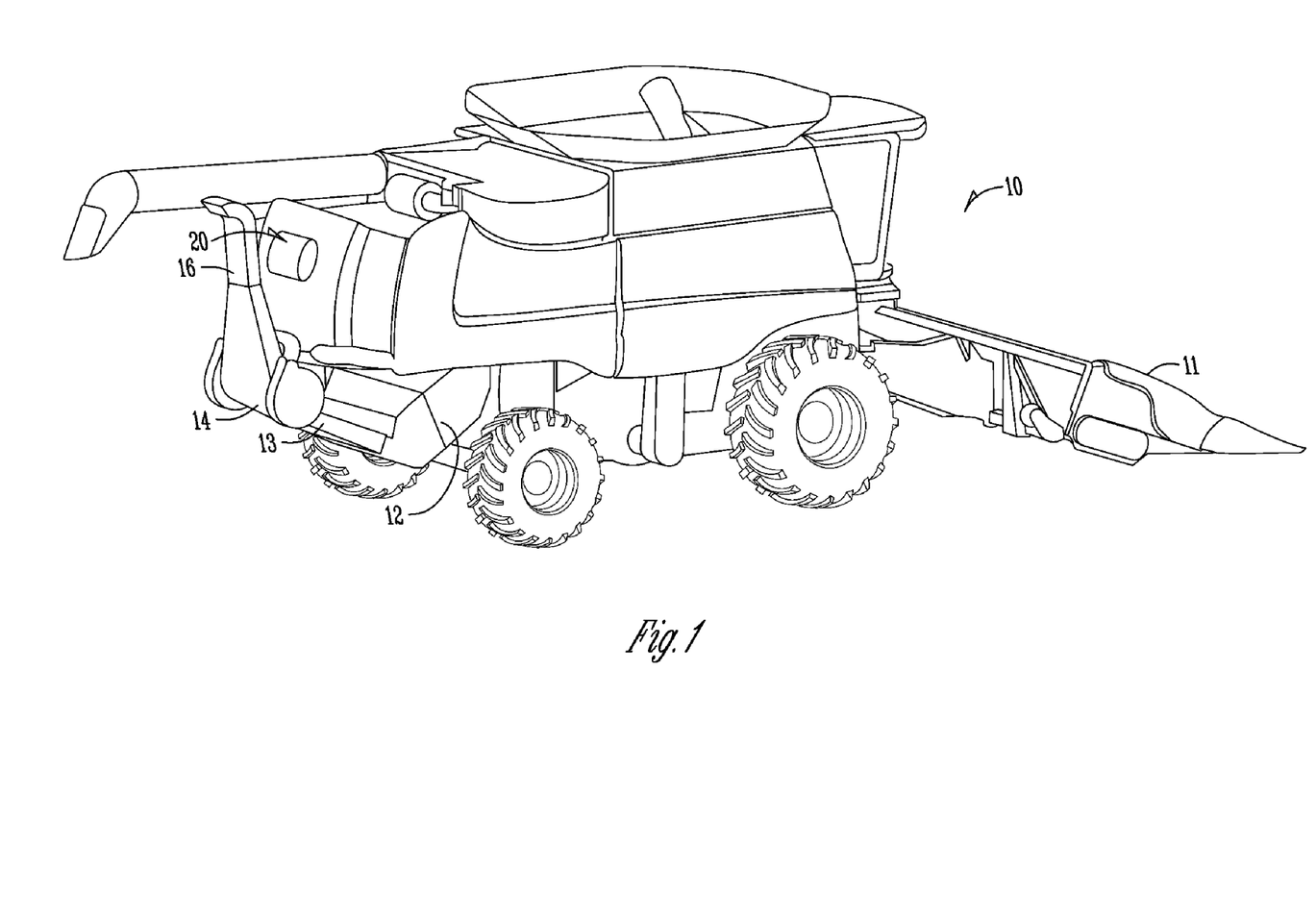
FIG. 1 is a perspective view of a combine adapted for harvesting biomass as well as spreading biomass.

FIG. 1 illustrates a combine harvester or harvesting machine 10 which is adapted for both harvesting biomass as well as spreading biomass. The harvesting machine 10 may be based on a self-propelled combine such as a John Deere 9750STS combine or similar platform. A residue chopper 12 is provided. A header 11 is shown on the front of the harvesting machine 10. In addition, a particle accelerator or silage blower 14 from a self-propelled forage harvester is mounted behind the chopper 12. The blower 14 may be from a John Deere 7500 self propelled forage harvester or similar blower and is mounted on the back of the harvesting machine 10 immediately behind the chopper 12. The blower 14 is a device used in conveying material. The blower may include a shaft upon which a series of paddles are mounted radially from the center. Material is fed tangentially into the perimeter of the paddles so the paddles hit and accelerate the material. Through the use of a transition member 13, all or a certain fraction of material flowing through the chopper 12 may be discharged either onto the ground or through the blower 14. A deflector plate may be positioned immediately below the transition member 13. When the transition member 13 is set to collect the crop residue, crop residue material is sent to the blower 14, and the crop residue material may then be blown through the chute 16 into a wagon or truck or other support vehicle to be removed from the field. An air movement unit 20 having one or more fans may be mounted on a rearward portion of the combine 10.

Figure 2:
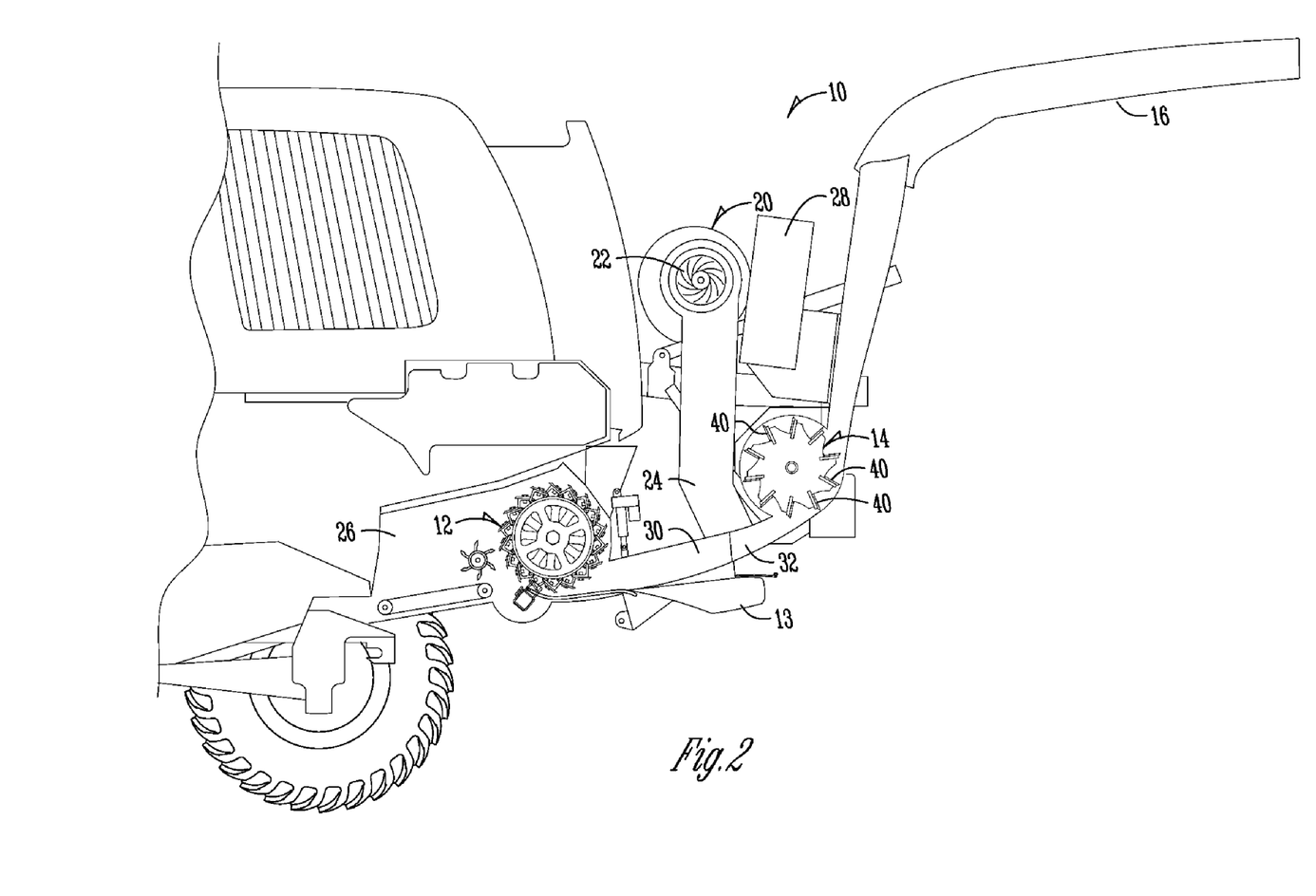
FIG. 2 is a cross section of a combine with an air movement unit.

FIG. 2 illustrates a cross section of a harvesting machine 10. Note that biomass material leaving the chopper 12 is either discharged at the transition member 13 or conveyed by the blower 14 through the chute 16. The position of the transition member 13 may be set through hydraulic, electronic, or other type of control so that 0 to 100 percent of the biomass material leaving the chopper is spread and that a corresponding 100 to 0 percent of the biomass material is collected.

Figure 4:
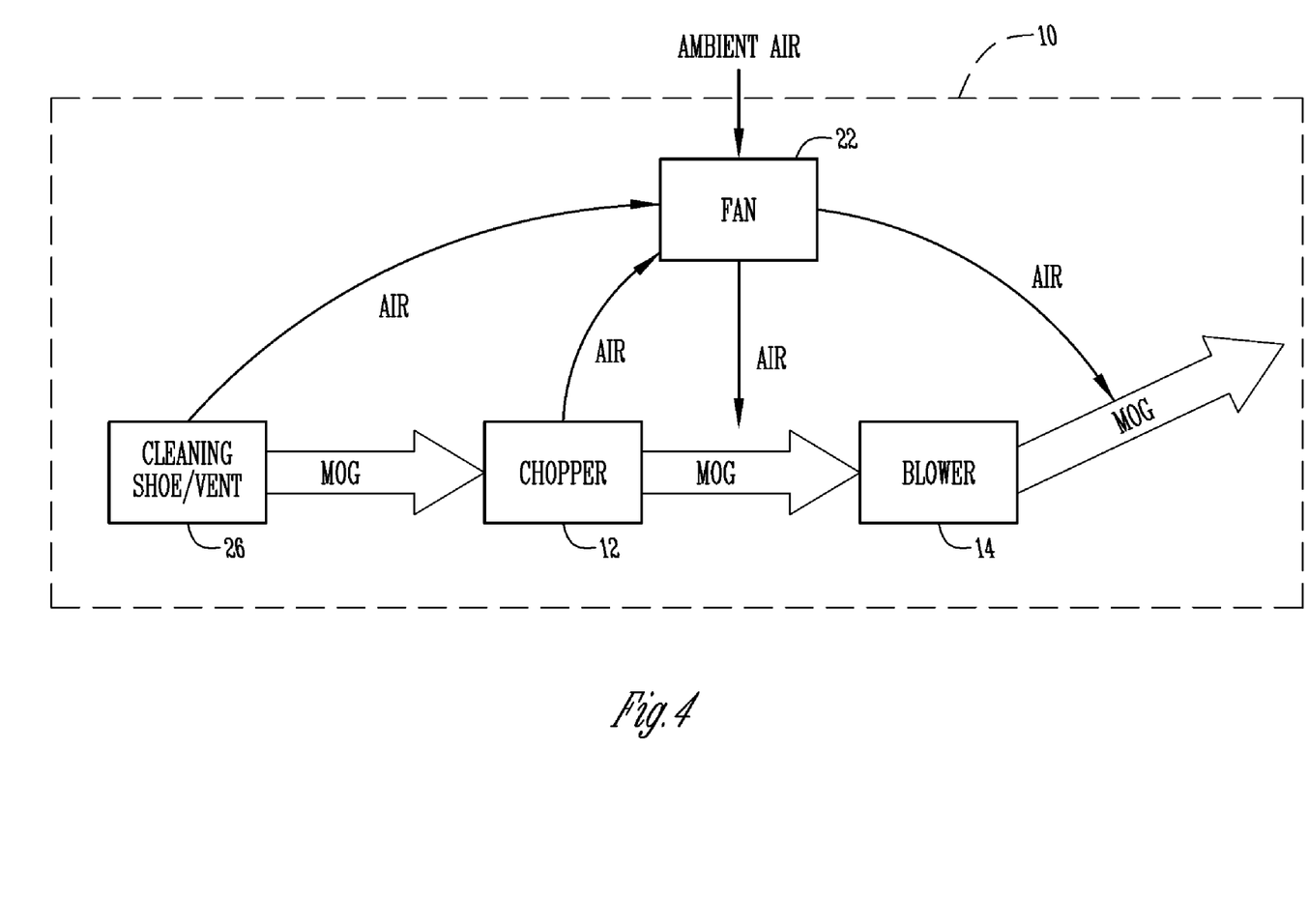
FIG. 4 is a diagram illustrating basic flow of material other grain and examples of air flow.

FIG. 4 illustrates the combine 10 with an air movement unit 20 including one or more fans 22 positioned at the back end of the combine 10. Each fan 22 is a device used to move air. One or more centrifugal fans, each having paddles mounted radially outward from a center shaft may be used. Each fan 22 moves air from an inlet at the center to outlets at the perimeter. As air moves into each fan 22, the paddles accelerate it and the air is forced outwardly by centrifugal force. The fans 22 used need not be centrifugal fans. The fans 22 may be mounted on a common shaft with the blower portion 14, or the fans may be remote mounted. Mounting on a common shaft may reduce complexity, parts, and maintenance compared to remote mounting. However, remote mounting will allow the fans 22 to be used for air movement when the combine is utilized in normal operation without biomass harvest. Having fans 22 co-located with a blower 14 at the exit of the combine 10 will increase combine efficiency, increase dust control, and assist feed into the chopper by evacuating air, as well as separating heavy and light materials through aspiration in and after the blower segment. In addition, it is to be understood that fan size may be adjusted in either the width or radial dimensions to alter the amount of airflow needed and the application at hand. Applications may include, without limitation, increased aspiration for separation of heavy and light materials, improved feeding through the chopper, improved grain shoe performance, improved dust control, and improved stover spreading.

The air movement unit 20 shown is positioned between the chopper 12 and the blower 14. The air aspiration conduit or outlet 28 is shown after the blower 14 to provide for cross aspiration and the air inlet 24 is shown between the chopper 12 and blower 14.

A harvesting machine outlet 30 is shown after the chopper 12. The embodiment shown in FIG. 2 assists in conveying light material from the harvesting machine outlet 30 to the inlet 32 of the blower 14. The inlet 24 to the fan 22 may be coincident with the center of the blower 14, or located near the blower 14 such that any airflow will assist material movement in the direction of the blower 14. For purposes of explanation, it is to be understood that a material is considered heavy if it has a low surface area to density ratio such that it is likely to be unaffected by an airstream. Stalks, corn cobs, and pebbles are examples of heavy materials. A material is considered light if it has a relatively high surface area to density ration. This material is likely to be displaced by an airstream. Chaff, corn husks, and feathers are examples of light materials.

During biomass harvesting operations, the fan 22 may assist pulling material into the area of the blower paddles 40 where the heavier material will be picked up by the paddles 40 and conveyed onwards towards the chute 16 while the lighter material is conveyed with the air. The fan 22 assists in evacuating air from the back end of the combine 10. Thus, the fan creates a low pressure area which helps pull material and dust through the machine. In addition, the fan 22 provides a source of air which may be used for further fractionation of light material from heavy material. An example can be separation of lighter non-grain material from heavier non-grain material. For instance heavier non-grain material like cobs (or substantial pieces of cobs) can be conveyed to blower 14 while lighter non-grain material like chaff, dust, and lighter debris or plant material can be aspirated by fan 22 by drawing the lighter non-grain material (e.g. chaff and dust), and separating it from heavier non-grain material (e.g. cobs), which continues to blower 14. The aspirated material can be carried by air flow generated by outlet 28. This is one way to achieve cob separation from lighter debris.

In addition to the specific configuration shown in FIG. 2, the present invention contemplates that the air inlet 24 may be located in various positions including positions which allow the air inlet to provide for intake of ambient air, before the chopper 12, or to provide for air intake from the cleaning shoe area or other vents of the combine 10. Likewise, the air outlet 28 from the fan 22 for cross aspiration is shown after the blower 14. However, the cross aspiration air outlet 28 could be in a number of different configurations such as, without limitation, after the chopper 12, between the chopper 12 and the blower 14, or elsewhere.

Figure 3:
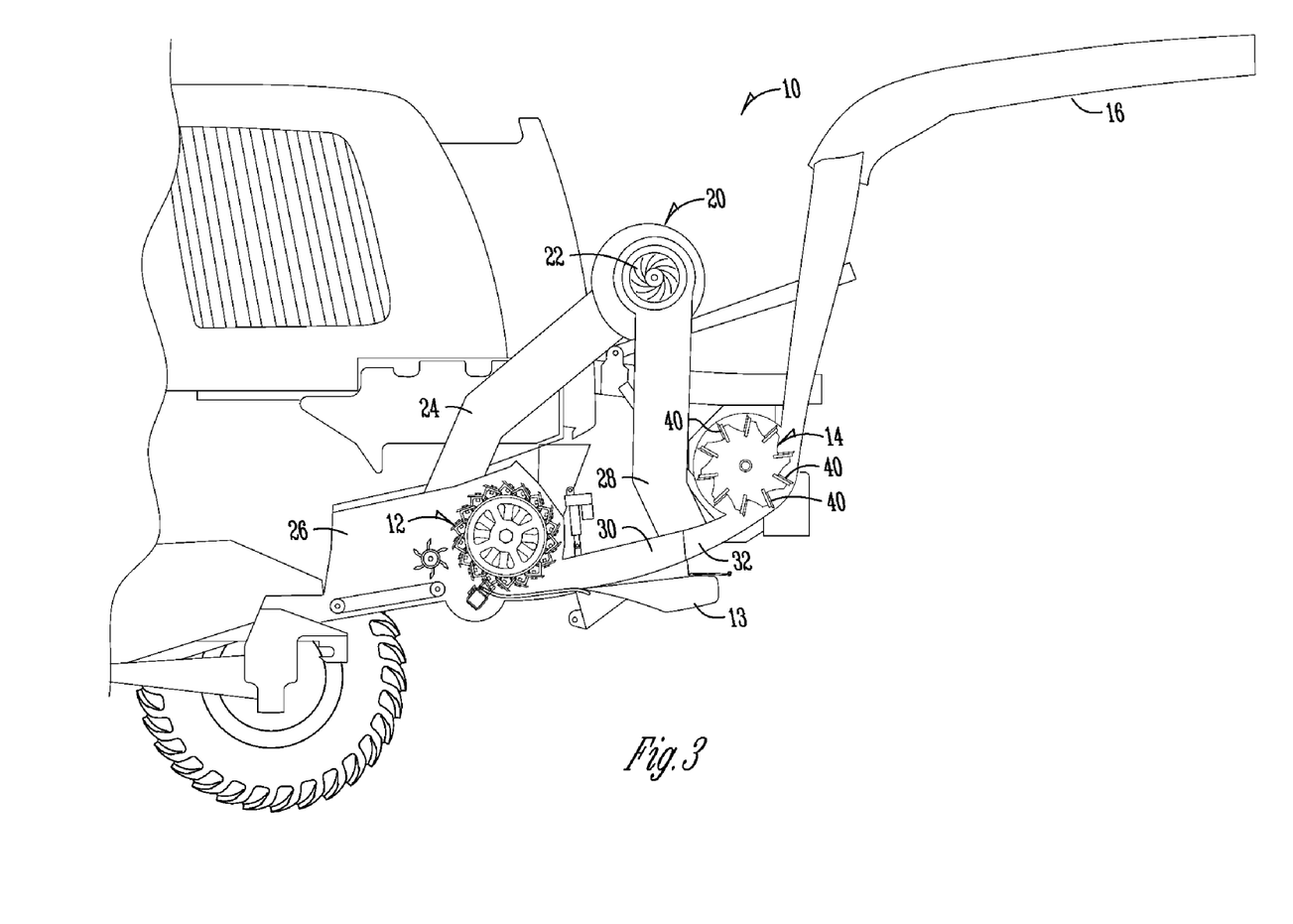
FIG. 3 is a cross section of a combine with an air movement unit.

FIG. 3 illustrates an alternative location for the air inlet 24 and the air outlet 28. In FIG. 3, the air inlet is before the chopper at the cleaning shoe 26. The air outlet 28 is after the chopper 12 and before the blower 14.

FIG. 4 is a diagram showing basic flow of material other than grain (MOG) and how air may be drawn into the fan from various locations and aspirated to various locations. The particular placement of the air inlet 24 and the air outlet 28 may be determined based upon the desired objectives and attendant design considerations.

For example, where a desired objective is to keep the cleaning shoe 26 of the combine clean, the fan 22 may have its air inlet 24 placed nearer the cleaning shoe 26 to provide for removal of air from the cleaning shoe 26. This may be achieved whether the combine is operating conventionally or for biomass collection. The cleaning shoe 26 may include a perforated screen which uses a stream of air to lift and fluidize the bed of crop material including grain and material other than grain (MOG). In this manner, the grain, being denser, falls through the screen while the MOG is carried over the screen and out the back of the harvesting machine. Modern harvesting machines have gained so much capacity that the evacuation of this air from the rear of the harvesting machine can be challenging. In fact, modern combines may flow more than 16,000 cubic feet per minute (CFM) through the cleaning shoe. When the stream of air is reduced, the fluidization breaks down and MOG falls through the screen, contaminating the grain sample. The addition of biomass harvest further complicates the matter as the additional machinery provides a restriction to airflow. Thus, the fan 22 may have its air inlet placed after the cleaning shoe 26 to assist in air flow by evacuating air from the harvesting machine. Having one or more fans 22 creating negative pressure at the outlet may increase the combine efficiency for conventional combines, or combines used in biomass harvest.

Where the desired objective is dust control, placement of the air inlet 24 of the fan 22 to evacuate air from the combine may be performed. Dust control is a challenge with modern combines flowing massive amounts of air. A restriction at the exit of the combine will cause a pressure build-up in the cleaning shoe 26. This pressure buildup may manifest itself as dust blowing out of the feeder house entrance. Having fans 22 creating negative pressure at the outlet 28 reduces dusting from other areas of the combine, and concentrates dust at the exit for better control. Thus dust and dusting out of the feeder house at the front of machine is controlled, thereby improving visibility from the front.

Where the desired objective is to provide for enhanced flow of chopped crop residue from the chopper 12 to the crop blower 14, the fan 22 may be placed at the chopper 12 or between the chopper 12 and the blower 14 to induce air flow. Such a placement may also be used to provide for fractionation of biomass into light and heavy fractions in the field and on the go. One of the existing concerns with biomass is the selective harvest of corn cobs. The primary contaminant in corn cobs coming out of the cleaning shoe 26 is husk. The fans 22 allow a double advantage by both sucking husks out and providing a source of air for further blowing husks out. The exhaust of the fans 22 can be used to increase the acceleration of light crop residues for improved delivery to the in field container such as a truck or wagon.

Figure 5:
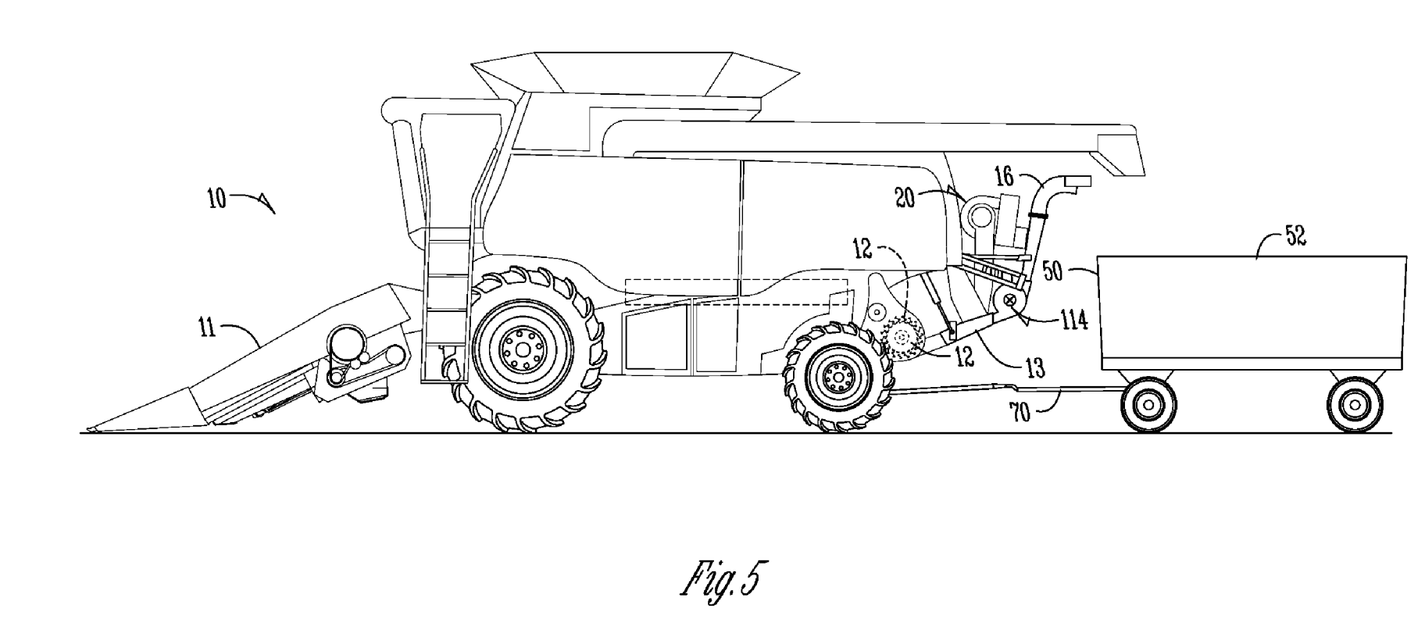
FIG. 5 illustrates one embodiment of a combine with an associated support vehicle for collecting non-grain material.

Thus, the fan 22 may have air inlets 24 or air outlets 28 at different positions depending upon the specific objectives to be achieved as the fan 22 has several purposes. The induced air flow from the harvesting machine body to the fan 22 will improve cleaning shoe function by reducing static air pressure inside the combine overall. In biomass harvest, the airflow will assist crop flow from the chopper 12 to the crop blower 14 or other location where the air inlet is positioned. Secondly, the exhaust air from the fan 22 can be used to aspirate the accelerated crop residue before delivery to the support vehicle (or other container) or the exhaust air can be utilized to enhance the flow of the crop residue to the support vehicle 50 shown in FIG. 5. The support vehicle 50 may be a wagon or truck which includes or forms a collection container 52.

It is further believed that many of the problems associated with conventional combines are the result of improper airflow. The present invention assists with addressing those problems through allowing for various placements of the air inlet of fans and the outlets of the fans. Thus, fans may be added to help cope with the loss of airflow accompanying the modifications to allow biomass harvest. In addition, the proper addition of fans offers advantages for conventional harvest.

Therefore, advantages associated with the present invention may include assisting in conveying light material from combine outlet to inlet of the blower, assisting in fractionation of plant material, assisting in combine efficiency by evacuating air from the cleaning shoe thus allowing the crop mat to maintain a fluidized bed, controlling dust, conveying light material, assisting in further fractionating heavy and light material downstream from the blower through aspiration, and other advantages.

Therefore, an improved combine has been disclosed. The present invention contemplates numerous variations in the number, type, and placements of a fan, its inlets, and its outlets. The present invention contemplates variations and alternatives in the manner in which the fan is used to affect air flow in either conventional or biomass harvesting applications both with respect to the air inlet and the aspiration. The present invention is not intended to be limited to the specific embodiments provided herein.

What is claimed is:

1. A harvesting machine, comprising:
    a self-propelled vehicle adapted for separating grain from non-grain material, the self-propelled vehicle having a forward portion and a rearward portion;
    a cleaning shoe;
    a fan positioned downstream of the cleaning shoe, the fan having an air inlet for providing air to the fan and an air outlet for providing air from the fan;
    a chopper operatively connected to the self-propelled vehicle and adapted for receiving the non-grain material and chopping the non-grain material;
    a blower positioned after the chopper at the rearward portion of the self-propelled vehicle; and
    the fan being positioned between the chopper and the blower and configured to assist in separating heavier portions of the non-grain material from lighter portions of the non-grain material after chopping of the non-grain material.

2. The harvesting machine of claim 1 wherein the air inlet being positioned proximate the cleaning shoe.

3. The harvesting machine of claim 1 wherein the air inlet of the fan being positioned between the chopper and the blower.

4. The harvesting machine of claim 1 wherein the air outlet of the fan being positioned after the blower.

5. The harvesting machine of claim 1 wherein the fan is a centrifugal fan.

6. The harvesting machine of claim 1 wherein the fan being configured to separate light and heavy non-grain materials.

7. The harvesting machine of claim 6 wherein the heavy non-grain material includes corn cobs.

8. The harvesting machine of claim 1 wherein the fan being configured to separate light and heavy non-grain materials by blowing or sucking.

9. A harvesting machine, comprising:
    a self-propelled vehicle adapted for separating grain from non-grain material, the self-propelled vehicle having a forward portion and a rearward portion;
    a cleaning shoe;
    a chopper operatively connected to the vehicle and adapted for receiving the non-grain material and chopping the non-grain material, wherein the non-grain material includes heavier non-grain material and lighter non-grain material;
    a blower adapted for assisting in conveying the heavier non-grain material from the chopper;
    a fan positioned between the chopper and the blower;
    an air inlet for providing air to the fan;
    an air outlet for providing air from the fan;
    the fan being configured to assist in separating the lighter non-grain material from the heavier non-grain material by air flow after chopping the non-grain material; and
    the blower positioned after the chopper at the rearward portion of the self-propelled vehicle.

10. The harvesting machine of claim 9 wherein the air inlet receives air from inside the harvesting machine to exhaust the air from the harvesting machine.

11. The harvesting machine of claim 10 wherein the air inlet is positioned proximate the cleaning shoe.

12. The harvesting machine of claim 9 wherein the air inlet is positioned between the chopper and the blower.

13. The harvesting machine of claim 9 wherein the air outlet is positioned after the blower.

14. The harvesting machine of claim 9 wherein the air inlet is positioned after the chopper.

15. The harvesting machine of claim 9 wherein the fan is a centrifugal fan.

16. The harvesting machine of claim 9 wherein the fan being configured to separate light and heavy materials.

17. The harvesting machine of claim 16 wherein the heavy materials include corn cobs.

18. The harvesting machine of claim 9 wherein the wherein the fan being configured to separate light and heavy non-grain materials by blowing or sucking.

19. A method, comprising:
    providing a harvesting machine comprising (a) a self-propelled vehicle adapted for separating grain from non-grain material, the self-propelled vehicle having a forward portion and a rearward portion (b) a cleaning shoe, (c) a fan, the fan positioned downstream of the cleaning shoe and the fan having an air inlet and an air outlet, (d) a chopper operatively connected to the self-propelled vehicle configured for receiving the non-grain material and chopping the non-grain material, (e) a blower positioned after the chopper at the rearward portion of the self-propelled vehicle, (f) the fan being positioned between the chopper and the blower;

intaking air though the air inlet of the fan;

chopping the non-grain material; and aspirating air though the air outlet of the fan to assist in separating light portions and heavy portions of the non-grain material after chopping the non-grain material.

20. The method of claim 19 wherein the air inlet and the air outlet are on opposite sides of a pathway through the blower.

21. The method of claim 19 further comprising conveying the non-grain material to a collection container, wherein the aspirating the air though the air outlet of the fan assists in flow of the light portions of the non-grain material to the collection container.

22. The method of claim 21 wherein the collection container being housed within a support vehicle.

23. A harvesting machine, comprising:
a self-propelled vehicle for separating grain from non-grain material, the self-propelled vehicle having a forward portion and a rearward portion;
a cleaning shoe;
a chopper operatively connected to the vehicle and adapted to receive the non-grain material and chop the non-grain material;
a fan positioned after the chopper and before a blower, the fan configured to assist in separating a heavier portion of the non-grain material from a lighter portion of the non-grain material after chopping of the non-grain material; and
the blower positioned after the chopper at the rearward portion of the self-propelled vehicle.

24. The harvesting machine of claim 23 wherein the heavier portion of the non-grain material includes corn cobs.

25. The harvesting machine of claim 23 wherein the fan is configured to separate the heavier portion of the non-grain material from the lighter portion of the non-grain material at an inlet of the fan.

26. The harvesting machine of claim 23 wherein the fan is configured to separate the heavier portion of the non-grain material from the lighter portion of the non-grain material at an outlet of the fan.

27. A harvesting machine, comprising:
a self-propelled vehicle for separating grain from non-grain material, the self-propelled vehicle having a forward portion and a rearward portion;
a cleaning shoe;
a chopper operatively connected to the vehicle and configured to receive the non-grain material and chop the non-grain material;
a blower positioned after the chopper at the rearward portion of the self-propelled vehicle;
a fan positioned after the chopper at the rearward portion of the self-propelled vehicle;
the fan positioned to provide air flow to assist in separating a heavier portion of the non-grain material from a lighter portion of the non-grain material after chopping of the non-grain material.

28. The harvesting machine of claim 27 wherein the blower being positioned after a harvesting machine outlet.

* * * * *

UNITED STATES PATENT AND TRADEMARK OFFICE
CERTIFICATE OF CORRECTION

PATENT NO. : 7,731,578 B2　　　　　　　　　　　　　　　　　　　　　　　　　　　Page 1 of 1
APPLICATION NO. : 12/262271
DATED : June 8, 2010
INVENTOR(S) : Stuart J. Birrell et al.

It is certified that error appears in the above-identified patent and that said Letters Patent is hereby corrected as shown below:

Col. 7, Claim 19, Line 10:
DELETE after air "though"
ADD after air --through--

Col. 8, Claim 27, Line 26:
ADD after positioned --between the chopper and the blower and--

Signed and Sealed this

Third Day of August, 2010

David J. Kappos
*Director of the United States Patent and Trademark Office*